United States Patent
Okabayashi et al.

(10) Patent No.: US 6,564,295 B2
(45) Date of Patent: May 13, 2003

(54) DATA STORAGE ARRAY APPARATUS, METHOD OF CONTROLLING ACCESS TO DATA STORAGE ARRAY APPARATUS, AND PROGRAM AND MEDIUM FOR DATA STORAGE ARRAY APPARATUS

(75) Inventors: Ichiro Okabayashi, Ikoma (JP); Manabu Migita, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 38 days.

(21) Appl. No.: 09/956,685

(22) Filed: Sep. 20, 2001

(65) Prior Publication Data

US 2002/0035670 A1 Mar. 21, 2002

(30) Foreign Application Priority Data

Sep. 20, 2000 (JP) ........................................ 2000-284720

(51) Int. Cl.$^7$ .............................................. G06F 12/00
(52) U.S. Cl. ........................ 711/114; 711/147; 711/154; 711/167
(58) Field of Search ........................ 711/111, 112, 114, 711/147, 150, 151, 152, 154, 156, 163, 167, 217

(56) References Cited

U.S. PATENT DOCUMENTS 5,592,612 A    1/1997   Birk 6,006,308 A  * 12/1999  Matsunami et al. ........ 711/114

FOREIGN PATENT DOCUMENTS

JP    H9-26854    1/1997

\* cited by examiner

*Primary Examiner*—Do Hyun Yoo
*Assistant Examiner*—Christian P. Chace
(74) *Attorney, Agent, or Firm*—RatnerPrestia (57) ABSTRACT

The data storage array apparatus having a RAID configuration according to the present invention comprises an internal access issuance part 10 which issues internal access requests to data storage parts 6, a group response monitoring part 11 which monitors processing responses in the data storage parts 6 until an internal access requesting group satisfies a predetermined condition and issues a notice of completion of monitoring, an external access response part 12 which notifies to outside of completion of external access in response to a predetermined situation, a continuous response monitoring part 13 which further continuously monitors, based on the notice of completion of monitoring, processing responses for each HDD with respect to an internal access request which was met with no processing response from the data storage parts, and an array operation control part 14 which controls, based on continuous response monitoring information from the continuous response monitoring part, issuance of internal accesses to the respective data storage parts.

25 Claims, 6 Drawing Sheets

DATA STORAGE ARRAY APPARATUS, METHOD OF CONTROLLING ACCESS TO DATA STORAGE ARRAY APPARATUS, AND PROGRAM AND MEDIUM FOR DATA STORAGE ARRAY APPARATUS

BACKGROUND OF THE INVENTION

1. Field of the Invention

The present invention relates to a data storage array apparatus which is formed by arranging a plurality of data storage parts, a method of controlling access to a data storage array apparatus, and a program and a medium for a data storage array apparatus.

2. Related Art of the Invention

A data storage array apparatus which is formed by arranging a plurality of data storage parts has been developed over recent years for an improved reliability and put into an actual use. In general, hard disk devices are used as the data storage parts, and such a data storage array apparatus is often called "a disk array device" or "RAID (Redundant Arrays of Inexpensive Disks)."

In the following, a conventional data storage array apparatus will be described with reference to associated drawings. This is the "server system which stores and supplies data" described in Japanese Patent Application Laid-Open Gazette No. 9-26854. The entire disclosure of Japanese Patent Application Laid-Open Gazette No. 9-26854 are incorporated herein by reference in its entirety.

Figure 6:
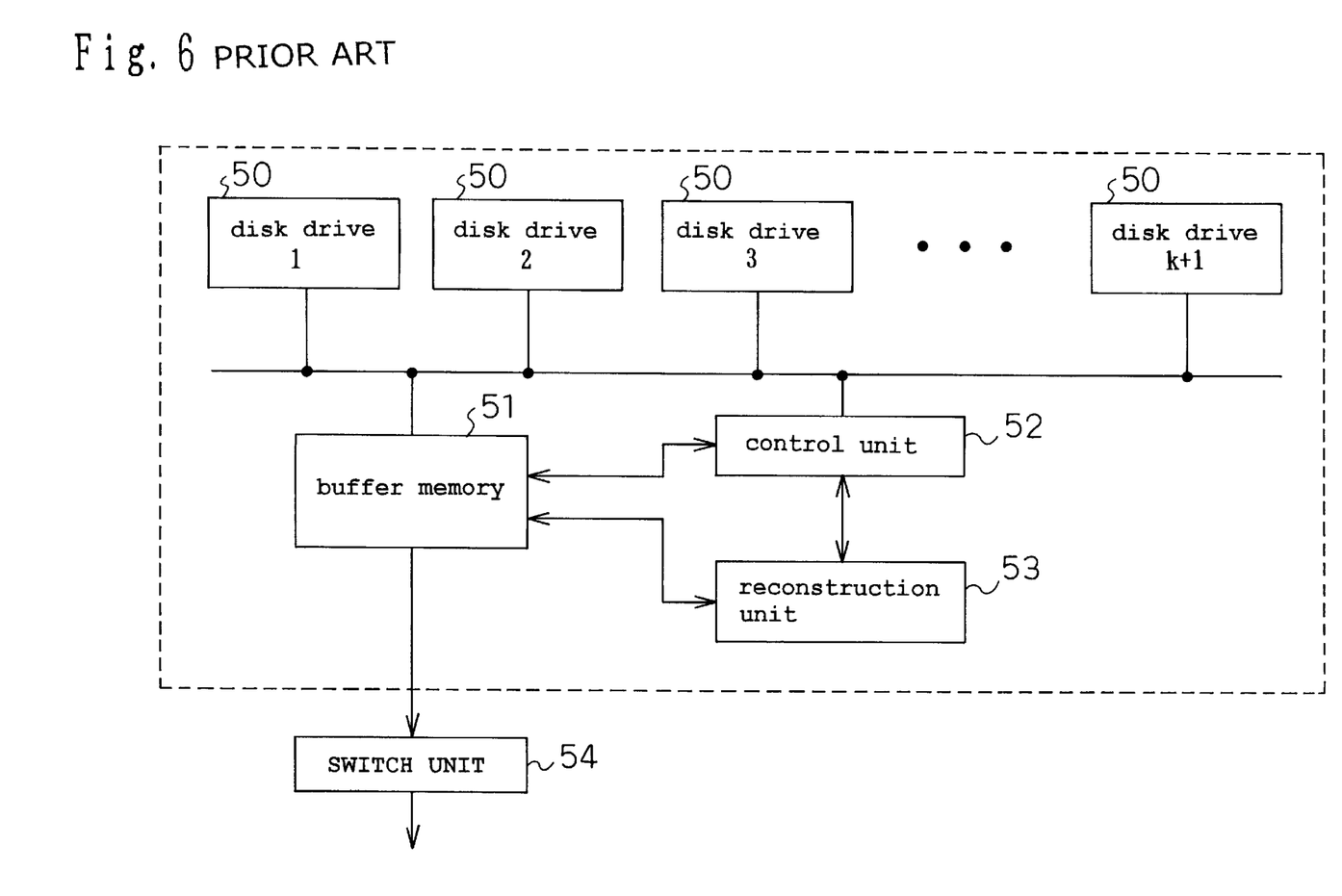
FIG. 6 is a configuration diagram of a conventional server system.
Figure 7:
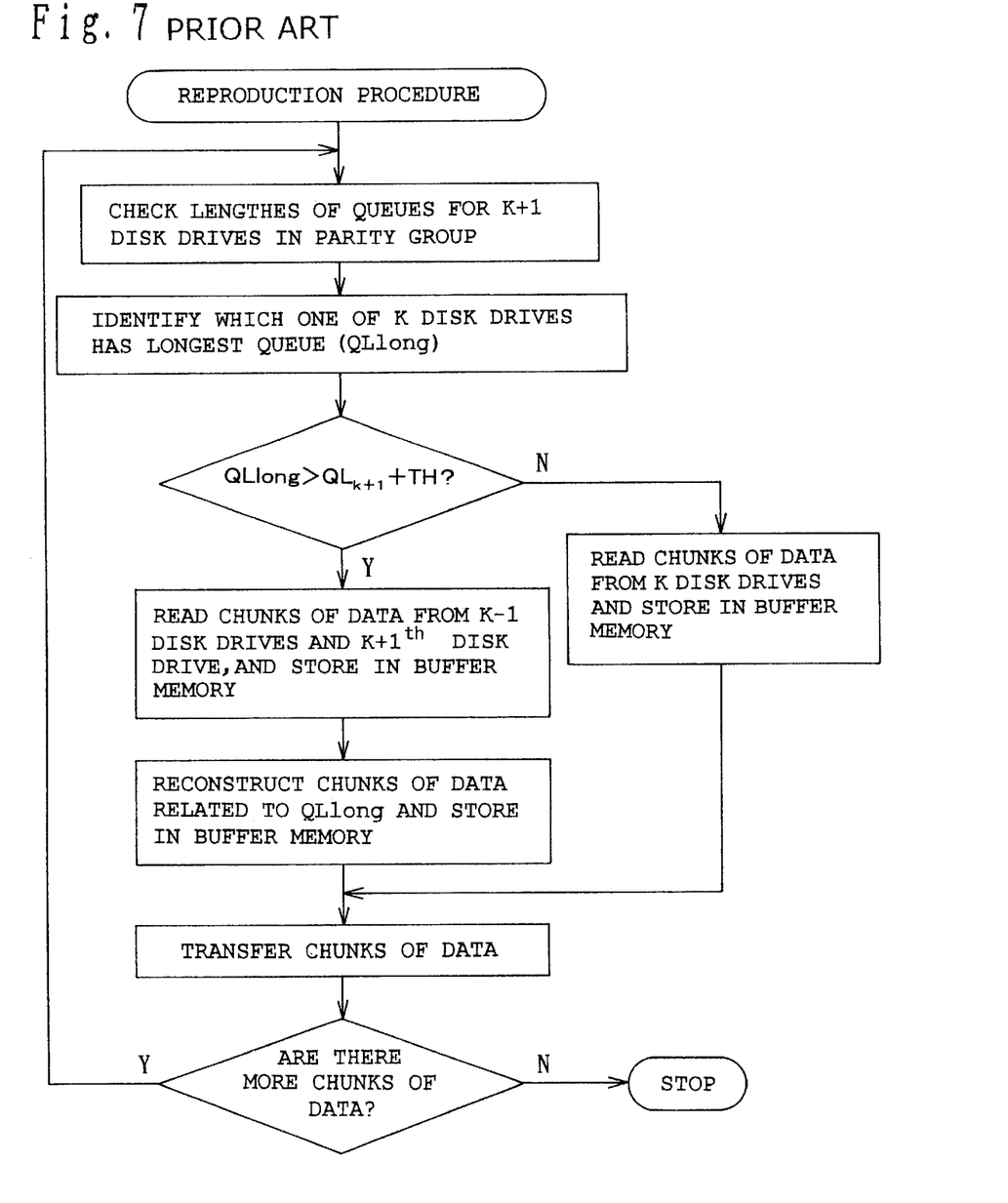
FIG. 7 is a flow chart showing operations in the conventional server system.

FIG. 6 is a configuration diagram of a conventional server system, and FIG. 7 is a flow chart showing operations in the conventional server system.

As shown in FIG. 6, k+1 pieces of disk drives 50 are connected to a buffer memory 51, and the buffer memory 51 is connected to a control unit 52 and a reconstruction unit 53. The first one through the k-th one store video data, while the k+1-th one stores parity data. The disk drives 50 are hard disk devices.

Shown in FIG. 6 is a server device which transmits video data, and basic operations are as described below.

For reading data, a read instruction is queued in each disk drive 50. The control part 52 identifies, out of the k pieces of disk drives 50 holding chunks of data which express video and a title, one disk drive 50 which holds the longest queue. When the length of the longest queue exceeds a predetermined value, data are read out from other disk drive and also from the k+1-th disk drive which holds parity instead of reading from this disk drive.

The chunk of data which are to be read but failed to be read out from the disk drive from is reconstructed by the reconstruction unit 53 using an error correction coding scheme.

In this manner, it is possible to bypass the most crowded disk drive without temporarily using the most crowded disk drive.

FIG. 7 shows this in the form of a flow chart.

K pieces of disk drives are read when the longest queue (QLlong) is smaller than a predetermined value QL(k+1)+TH. Otherwise, the reconstruction mentioned above is carried out.

As the longest queue is avoided, it is possible to avoid temporary confusion. Further, a new demand is not added to the longest queue, and therefore, a possibility of such temporary confusion is reduced remarkably low.

In short, how much the disk drives can be crowded is managed by means of queues. When a queue in a certain disk drive is long and the length of the queue is equal to or more than the predetermined value, reading from this disk drive is not performed.

However, controlling by means of the statuses of the queues regarding issuance of instruction, the configuration described above has the following problem.

That is, after receiving an instruction, a disk drive transmits data in a certain predetermined period of time. If this delay is approximately constant, the length of a queue regarding issuance of instruction, i.e., the queue being long or short, corresponds to the speed of a response time, i.e., an increased response time or a shortened response time, without any problem.

However, a characteristic of a disk drive is that a response is sometimes extremely slow. For instance, while a usual response is from 50 up to 100 ms, a response may be as extremely slow as 1 sec or more.

In other words, with only information which tells whether an instruction queue is long or short, it is not possible to accurately determine whether a response time increases or decreases.

Further, in the conventional configuration, a condition of an operation that data are restored avoiding a long queue is called "degeneration" during which data can not be restored if a disk drive other than a bypassed disk drive described above has a breakdown.

For a better reliability, therefore, degeneration should be avoided as much as possible. Despite this, the conventional configuration tends to invoke degeneration.

SUMMARY OF THE INVENTION

Accordingly, in view of the problems with the conventional techniques, the present invention aims to provide a data storage array apparatus which bears a low probability of invoking degeneration, a method of controlling access to such a data storage array apparatus, and a program and a medium for a data storage array apparatus.

One aspect of the present invention is a data storage array apparatus which comprises a plurality of data storage parts which store transferred data in accordance with a predetermined rule, an access issuance part, a group response monitoring part, an access response part, a continuous response monitoring part and an array operation control part, comprising:

said access issuance part, by means of a predetermined algorithm, groups first access requests from a sender of said data into a group which includes second access requests directed to said more than one data storage parts, treats said group as a second access requesting group; and issues said second access requests included in said second access requesting group to said data storage parts based on access issuance control provided to said data storage parts by said array operation control part, said group response monitoring part individually manages each said second access requesting group, monitors processing responses, in said data storage parts, of said second access requesting group until said second access requesting group satisfies a predetermined condition, and issues a notice of completion of monitoring when said condition is satisfied, said access response part notifies said sender of said data of completion of accessing in response to a predetermined situation, said continuous response monitoring part classifies, for each data storage part, said second access requests of said second access requesting group which were met with no processing response from the data storage parts and further continuously monitors whether there are corresponding processing responses based on said notice of completion of monitoring thus issued, and issues a result of the monitoring as continuous response monitoring information, said array operation control part provides access issuance control for said data storage parts to said access issuance part based on said continuous response monitoring information thus issued, so that an operation mode of said data storage array apparatus as a whole is controlled.

Another aspect of the present invention is the data storage array apparatus, wherein said access response part notifies said sender of said data of completion of accessing based on said notice of completion of monitoring from said group response monitoring part.

Still another aspect of the present invention is the data storage array apparatus, wherein said access response part notifies said sender of said data of completion of accessing based on a notice of issuance from said access issuance part.

Yet still another aspect of the present invention is the data storage array apparatus, wherein during reading, based on said notice of completion of monitoring from said group response monitoring part, said access response part restores, using redundancy, data (1) for which there was no processing response, in said data storage parts, of said second access requesting group, or (2) for which there was an error response, or (3) for which issuance of second access requests were suppressed in said access issuance part, and said access response part notifies said sender of said data of completion of accessing.

Still yet another aspect of the present invention is a data storage array apparatus which comprises a plurality of data storage parts which store transferred data in accordance with a predetermined rule, an access issuance part, a group response monitoring part, an access error storage part, an access response part, a continuous response monitoring part and an array operation control part, comprising:

said access issuance part, by means of a predetermined algorithm, groups first access requests from a sender of said data into a group which includes second access requests to said more than one data storage parts, treats said group as a second access requesting group, and issues said second access requests included in said second access requesting group to said data storage parts based on access issuance control provided to said data storage parts by said array operation control part and based on a content in said access error storage part which stores an error status of a previously issued external access, said group response monitoring part individually manages each said second access requesting group, monitors processing responses in said data storage parts directed to said second access requesting group until said second access requesting group satisfies a predetermined condition, and issues a notice of completion of monitoring when said condition is satisfied, said access error storage part registers, based on said notice of completion of monitoring thus issued, accesses (1) for which there was no processing response, in said data storage parts, of said second access requesting group or for which there was an error response, or (2) for which issuance of second access requests were suppressed in said access issuance part, said access response part notifies said sender of said data of completion of accessing in response to a predetermined situation, said continuous response monitoring part classifies, for each data storage part, said second access requests of said second access requesting group which were met with no processing response from the data storage parts and further continuously monitors whether there are corresponding processing responses based on said notice of completion of monitoring thus issued, and issues a result of the monitoring as continuous response monitoring information, said array operation control part provides access issuance control for said data storage parts to said access issuance part based on said continuous response monitoring information thus issued, so that an operation mode of said data storage array apparatus as a whole is controlled.

A further aspect of the present invention is the data storage array apparatus, wherein said access response part notifies said sender of said data of completion of accessing based on said notice of completion of monitoring from said group response monitoring part.

A still further aspect of the present invention is the data storage array apparatus, wherein said access response part notifies said sender of said data of completion of accessing based on a notice of issuance from said access issuance part.

A yet further aspect of the present invention is the data storage array apparatus, wherein there are as many said continuous response monitoring parts as said data storage parts.

A still yet further aspect of the present invention is the data storage array apparatus, wherein said array operation control part investigates, based on said continuous response monitoring information from said continuous response monitoring part, the number of said second access requests to which processing has not completed, and when this number reaches or exceeds a certain number, said array operation control part prohibits issuance of said second access requests to corresponding ones of said data storage parts.

An additional aspect of the present invention is the data storage array apparatus, wherein said array operation control part stores the number of times said continuous response monitoring part has executed continuous response monitoring, and when this number reaches or exceeds a certain number, said array operation control part shifts said data storage array apparatus into an operation of degeneration.

A still additional aspect of the present invention is the data storage array apparatus, wherein said array operation control part, after prohibiting issuance of said second access requests, shifts the entire operation of said data storage array apparatus into an operation of temporary degeneration, and said temporary degeneration is an operation that issuance of said second access requests directed to one or more of said data storage parts which form said data storage array apparatus is temporarily suppressed, and with respect to an access occurring during this, access data are restored utilizing a redundant configuration.

A yet additional aspect of the present invention is the data storage array apparatus, wherein said array operation control part investigates, based on said continuous response monitoring information from said continuous response monitoring part, the number of said second access requests to which processing has not completed, and when this number is equal to or smaller than a certain number, said array operation control part lifts the prohibition of issuance of said second access requests to corresponding ones of said data storage parts.

A still yet additional aspect of the present invention is the data storage array apparatus, wherein said array operation control part, after resolving the prohibition of issuance of said second access requests, shifts the entire operation of said data storage array apparatus from temporary degeneration into normal or partial reconstruction, and an operation of said partial reconstruction is an operation of adding redundancy of data to writing which occurs during said temporary degeneration.

A supplementary aspect of the present invention is the data storage array apparatus, wherein when recognizing based on said continuous response monitoring information that said second access requests under monitoring are not completed yet even after a predetermined period of time, said array operation control part prohibits issuance of said second access requests to corresponding ones of said data storage parts and issues a reset command or a cancel command to corresponding ones of said data storage parts.

A still supplementary aspect of the present invention is the data storage array apparatus, wherein when said array operation control part issues said reset command, said array operation control part lifts the prohibition of issuance of said second access requests to corresponding ones of said data storage parts upon normal completion of said reset command and shifts the entire operation of said data storage array apparatus from temporary degeneration into normal or partial reconstruction.

A yet supplementary aspect of the present invention is the data storage array apparatus, wherein after said array operation control part issues said reset command, if said reset command ends abnormally, said array operation control part issues said reset command once again to corresponding ones of said data storage parts.

A still yet supplementary aspect of the present invention is the data storage array apparatus, wherein the number of times that said array operation control part has issued said reset command is stored, and when this number becomes a certain number or larger, said data storage array apparatus is shifted into an operation of degeneration from an operation of temporary degeneration.

Another aspect of the present invention is the data storage array apparatus, wherein said array operation control part recognizes based on said continuous response monitoring information a response which indicates that said second access requests under monitoring have completed during said predetermined period of time, and if these requests are writing, said array operation control part deletes corresponding requests from said access error storage part.

Still another aspect of the present invention is the data storage array apparatus, wherein said predetermined condition is satisfied (1) when N−1 pieces of said second access requests are met with responses which indicate completion of processing in the case that there are N pieces of said second access requests included in said second access requesting group, or (2) when a predetermined period of time has elapsed after issuance of said second access requests which are included in said second access requesting group.

Yet still another aspect of the present invention is a method of controlling access to a data storage array apparatus which comprises a plurality of data storage parts which divide predetermined data and store as data having a redundant configuration, comprising:

an access issuing step of creating and issuing a plurality of second access requests which respectively correspond to said data storage parts based on a predetermined algorithm in response to a first access request;

a monitoring step of monitoring whether processing corresponding to said second access requests thus issued have completed during a predetermined period of time and issuing a result of monitoring; and a decision step of deciding, based on information included in said result of monitoring thus issued regarding the number of said accesses which have not completed yet, whether to newly issue second access requests at said access issuing step.

Still yet another aspect of the present invention is the method of controlling access to a data storage array apparatus, comprising a historical information holding step of holding historical information, which indicates whether said accesses have been processed normally in said data storage parts, for each one of said data storage parts, wherein at said decision step, said decision is made considering said historical information as well which is held at said historical information holding step.

A further aspect of the present invention is a program for making a computer function as all or part of said parts except for said data storage parts of the data storage array apparatus.

A still further aspect of the present invention is a program for making a computer execute all or part of said steps of the method of controlling access to a data storage array apparatus.

A yet further aspect of the present invention is a medium which can be read on a computer and holds a program and/or data for making a computer execute the functions of all or part of said parts except for said data storage parts of the data storage array apparatus.

A still yet further aspect of the present invention is a medium which can be read on a computer and holds a program and/or data for making a computer execute the operations at all or part of said steps of the method of controlling access to a data storage array apparatus.

EXPLANATION OF THE REFERENCE SYMBOLS

1 hard disk device (HDD)
2 I/O port
3 memory
4 parity engine
5 control device
6 data storage part 10 internal access issuance part
11 group response monitoring part
12 external access response part
13 continuous response monitoring part
14 array operation control part
15 access error storage part
50 disk drive
51 buffer memory
52 control unit
53 reconstruction unit

PREFERRED EMBODIMENTS OF THE INVENTION (First Preferred Embodiment)

In the following, a data storage array apparatus according a first preferred embodiment of the present invention will described with reference to associated drawings. Hard disks used as data storage parts. A data storage array apparatus called "a disk array device" as well.

Figure 1:
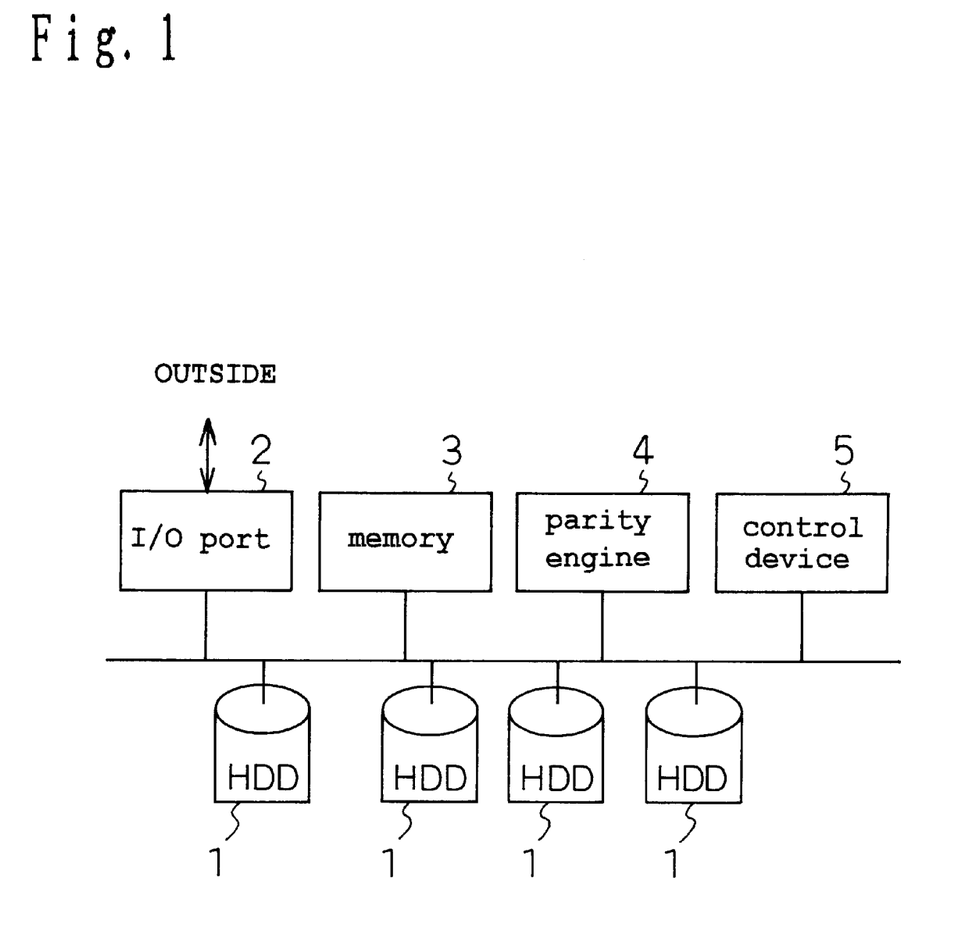
FIG. 1 is a configuration diagram of the data storage array apparatus according to the first preferred embodiment.
Figure 2:
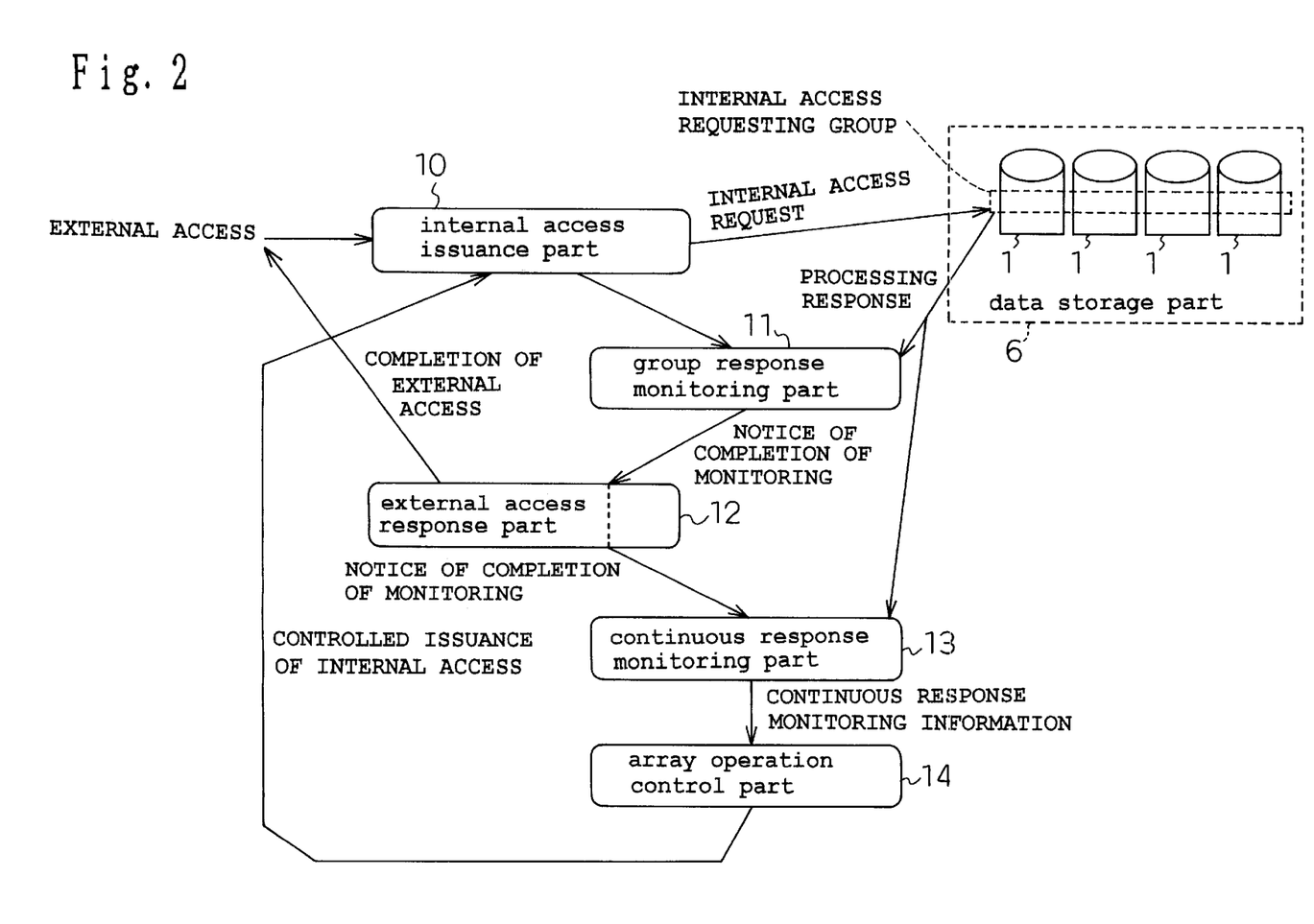
FIG. 2 is a flow chart showing the operations in the data storage array apparatus according to the first preferred embodiment.
Figure 3:
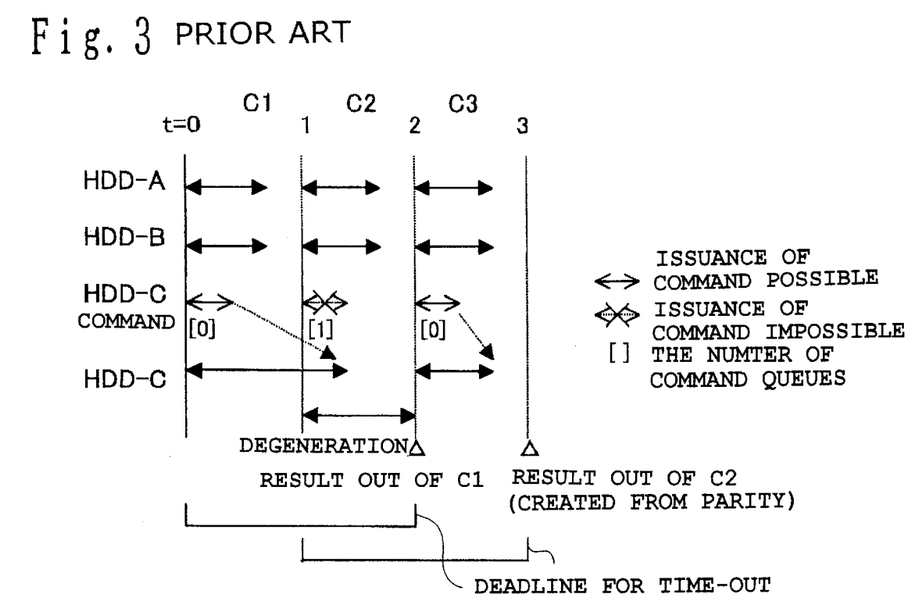
FIG. 3 is a timing chart of operations in a conventional data storage array apparatus.
Figure 4:
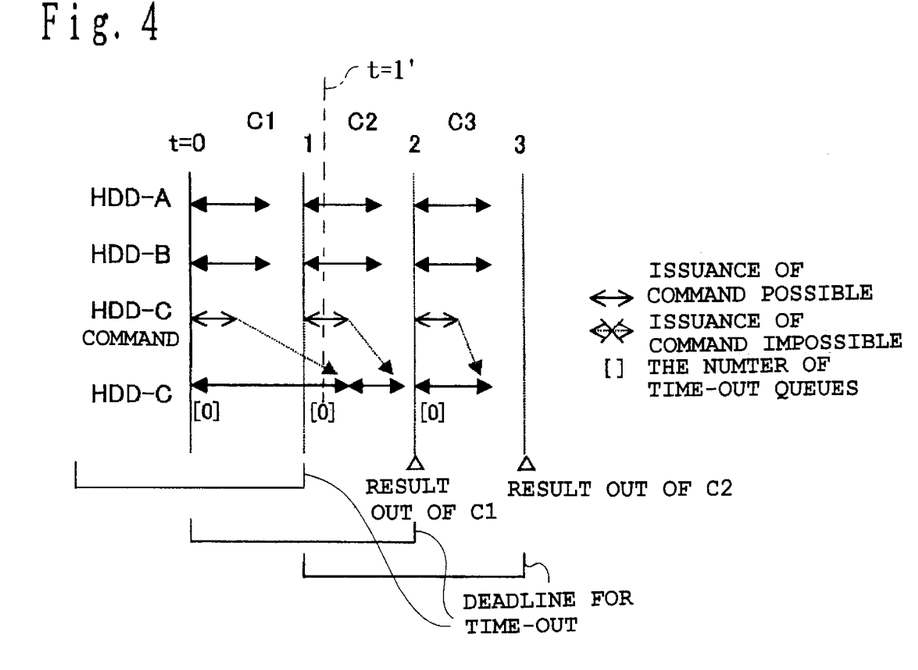
FIG. 4 is a timing chart of the operations in the data storage array apparatus according to the first preferred embodiment.

FIG. 1 is a configuration diagram of the data storage array apparatus according to the first preferred embodiment of the present invention, and FIG. 2 is a flow chart showing operations in the data storage array apparatus according to the first preferred embodiment. FIG. 3 is a timing chart of operations in a conventional data storage array apparatus, and FIG. 4 is a timing chart of the operations in the data storage array apparatus according to the first preferred embodiment. FIG. 3 is referred to for comparison with FIG. 4.

In these drawings, denoted at 1 are hard disk devices (hereinafter referred to as "HDDs"). Denoted at 2 is an I/O port for connection with outside, denoted at 3 is a memory, denoted at 4 is a parity engine, and denoted at 5 is a control device, all of which is connected together with the HDDs 1 to a bus.

Denoted at 6 are data storage parts which are formed by the HDDs 1. Denoted at 10 through 14 are control means, of which the means 10 is an internal access issuance part, the means 11 is a group response monitoring part, the means 12 is an external access response part, the means 13 is a continuous response monitoring part and the means 14 is an array operation control part. These will be described as control software for the control device 5, but of course may be realized with hardware.

Now, operations in the data storage array apparatus according to the first preferred embodiment having such a configuration as above will be described, while at the same time describing a preferred embodiment of a method of controlling access to a data storage array apparatus according to the present invention.

The data storage array apparatus operates as a so-called RAID. RAID 3 is a basic assumption in the description below. Basic principles remain the same with RAID level 4, RAID level 5 and other RAID levels as well.

As shown in FIG. 1, the plurality of HDDs 1 are accessed in parallel. The HDDs 1 store data and parity. The illustration is an example where there are four HDDs 1 of which three store data and the remaining one stores parity.

Parity is created as an exclusive OR (or its inversion) of corresponding bits in the respective pieces of the data. Therefore, there are an even (or odd) number of logic 1 among the corresponding bits.

For reading, the control device 5 issues commands en masse, and the data read out from the HDDs 1 are sent to outside at the I/O port 2 after stored in the memory 3. If one of the HDDs 1 storing the data has a breakdown during reading, the data are reconstructed from the remaining three HDDs.

In other words, the parity engine 4 yields an exclusive OR which is then transmitted to outside at the I/O port 2. The flow is opposite to this during writing. At this stage, the parity engine 4 creates parity from the three pieces of data, and parity is thereafter stored in the corresponding HDD 1.

The foregoing is general operations in a data storage array apparatus.

Now, characteristic operations according to the first preferred embodiment will be described with reference to FIG. 2.

The following is mainly regarding control conducted by the control device 5. The internal access issuance part 10 converts an external access request from outside into an internal access request in accordance with a predetermined algorithm.

The predetermined algorithm refers to a RAID level, e.g., the RAID level 3, the RAID level 4, the RAID level 5. The RAID level 3 is the level used in the first preferred embodiment, so that predetermined blocks in the plurality of HDDs 1 within the data storage part 6 are treated as an internal access requesting group.

Based on internal access issuance control directed to the data storage part 6 provided by the array operation control part 14, internal access requests are issued to the internal access requesting group.

First access requests according to the present invention correspond to the external access requests described above while second access requests according to the present invention correspond to the internal access requests described above. A second access request group according to the present invention corresponds to the internal access requesting group described above.

Processing at the access issuing step according to the present invention corresponds to operations conducted by the internal access issuance part, and processing at the monitoring step according to the present invention corresponds to operations including the group response monitoring part. Processing at the decision step according to the present invention corresponds to operations conducted by the array operation control part.

The group response monitoring part 11 monitors a processing response in the data storage part 6 until the internal access requesting group satisfies a predetermined condition, and issues a notice of completion of monitoring when the condition is met.

The predetermined condition is satisfied when the following occurs, for example.

(1) A time elapsed since the issuance of internal access requests exceeds a predetermined period of time, or
(2) Three processing responses exist for four HDDs (N−1 pieces of processing responses for N units of HDDs). In this case, one piece of data which failed to be met with a response is reconstructed using these three responses.

The external access response part 12 notifies to outside of completion of external accessing in response to a predetermined situation. In response to the predetermined situation herein referred to, the notice above is issued when the followings occur, for instance.

(1) The completion of external accessing is notified in response to the notice of completion of monitoring from the group response monitoring part 11,
(2) The completion of external accessing is notified in response to a notice of issuance from the internal access issuance part 10, or
(3) During reading, in response to the notice of completion of monitoring from the group response monitoring part 11, after restoring data using parity when the following occurs, the completion of external accessing is notified:
(3-1) There is no processing response from the data storage parts 6,
(3-2) There is an error response, or
(3-3) The issuance of internal access requests is suppressed within the internal access issuance part 10.

In response to the notice of completion of monitoring from the group response monitoring part 11, the continuous response monitoring part 13 classifies internal access requests which were met with no processing response from the data storage part 6 for each HDD, and continues to monitor processing responses.

In other words, the continuous response monitoring part 13 classifies internal access requests which were met with no processing response from the data storage parts for each data storage part, further continuously monitors whether processing responses are received or not, and issues a result of the monitoring as continuous response monitoring information.

The continuous response monitoring part 13 monitors the respective HDDs 1 independently of each other. Hence, there may be as many continuous response monitoring parts 13 as the number of the HDDs 1.

In response to the continuous response monitoring information from the continuous response monitoring part 13, the array operation control part 14 controls the internal access issuance part 10 for suppressing issuance of internal accesses to the respective data storage parts 6. As issuance of internal accesses is controlled based on the continuous response monitoring information, the issuance is controlled in accordance with a condition of completion of an access to the data storage parts 6.

For example, based on the continuous response monitoring information from the continuous response monitoring part 13, when the number of absences of completion responses to internal access requests under monitoring in the data storage parts 6 reaches or exceeds a predetermined number, the entire operation is temporarily degenerated and issuance of internal access requests to the data storage parts 6 is prohibited.

After this, when the number of absences of completion responses becomes equal to or smaller than the predetermined number, the entire operation is transferred back to normal or partial reconstruction, and the prohibition of issuance of internal access requests to the data storage parts 6 is lifted. This is independent of issuance of internal access requests from the internal access issuance part 10.

The temporary degeneration herein referred to is a situation that one or more data storage parts 6 are temporarily subjected to suppressed issuance of internal access requests, and with respect to external accessing occurring during this, external access data are restored as much as possible by means of a redundant configuration.

During partial reconstruction, the redundancy is restored for writing occurring during the temporary degeneration above.

In other words, during such writing, some hard disk device fails to be written in. Therefore, a redundant data structure of data in other hard disk already written in is utilized to restore data which failed to be written, and thus restored data are written in the hard disk which was not written.

This does not require exchange of the data storage parts 6 or replacement with a spare data storage part.

The array operation control part 14 further executes the following, i.e., to store the number of times the continuous response monitoring part 13 has continuously monitored responses for each HDD 1, and to regard any HDD 1 with respect to which the number of times reaches or exceeds a predetermined number as malfunctioning and to accordingly degenerate the entire operation.

When monitoring a period of time elapsed since the continuous response monitoring part 13 requested for continuous response monitoring and recognizing that the elapsed time is a certain period or more, issuance of internal access requests to the corresponding data storage part 6 is prohibited, and a reset command or a cancel command is issued to this data storage part 6.

When the reset command ends normally, the prohibition of issuance of internal access requests to the corresponding data storage part 6 is lifted and the data storage array apparatus is brought back to normal or partial reconstruction from the temporary degeneration.

When the reset command ends abnormally, a reset command is issued to the corresponding data storage part 6 once again. The number of thus issued reset commands is stored, and when this number becomes a certain number or larger, the data storage array apparatus is transferred into degeneration from the temporary degeneration.

The number of absences of completion responses, not the number of issued internal access requests, is used for management as described above, and hence, the following effect is obtained. This effect will now be described specifically with reference to FIGS. 3 and 4.

Issuance of an internal access request is called issuance of a command while an absences of completion response is called a time-out, and the number of each of this is accumulated in a queue. For simplicity of description, it will be assumed that an operation is stopped when a queue becomes 1.

FIG. 3 shows conventional control by means of the number of issued commands, and FIG. 4 shows control according to the first preferred embodiment which uses the number of time-out.

A read operation where there are three HDDs will be described. Termination is normal in HDD-A and HDD-B, while an access is delayed in HDD-C. The symbols C1 through C3 denote read cycles, and t=0, 1, 2, 3 represents an elapsed time. The deadline for time-out is a point at which a 2-cycle period ends.

That is, when a command is issued in a cycle C1 (t=0) termination by the end of the cycle C2 (t=2) is normal and termination not in time is time-out.

First, FIG. 3 will be described.

In HDD-A and HDD-B, accesses complete in the respective cycles. In the case of HDD-C, a command is issued during the cycle C1 and an access completes during the cycle C2, and therefore, reading completes at the end of the cycle C2 (t=2).

At the beginning of the cycle C2 (t=1), a command queue is 1, and issuance of a command during the cycle C2 is accordingly suppressed. In short, degeneration is invoked during the cycle C2.

Since this prohibits reading from HDD-C at the end of the cycle C3 (t=3), a result for HDD-C is reconstructed from HDD-A and HDD-B. No command is issued during the cycle C2, the normal operation is recovered in the cycle C3 (the command queue is 0) and a command is issued.

Next, FIG. 4 will be described.

In HDD-A and HDD-B, accesses complete in the respective cycles. In HDD-C, a command is issued during the cycle C1 and an access completes during the cycle C2, and therefore, reading completes at the end of the cycle C2 (t=2).

Since a time-out queue is 0 at the beginning of the cycle C2 (t=1) a command is issued during the cycle C2 as well.

That is, the operation is normal during the cycle C2 as well. If reading which is ongoing during the cycle C2 completes during the cycle C2, the normal operation can continue in the cycle C3, too. In short, no degeneration is invoked. A result of the cycle C2 is obtainable at the end of the cycle C3 (t=3).

According to the first preferred embodiment, an unoccupied period during the cycle C2 after reading from HDD-C is used effectively, and degeneration is not invoked if an access completes during this.

As described above, according to the first preferred embodiment, since internal accesses are controlled by means of the number of absences of completion responses (the number of time-out), a probability of degeneration decreases. Reconstruction is impossible if an HDD breaks down during degeneration, and therefore, degeneration should be avoided as much as possible. Hence, the data storage array apparatus according to the present invention is highly reliable.

(Second Preferred Embodiment)

In the following, a data storage array apparatus according to a second preferred embodiment of the present invention will be described with reference to associated drawings.

The following is mainly on differences from the first preferred embodiment. Except for these, the second preferred embodiment is basically similar to the first preferred embodiment.

Figure 5:
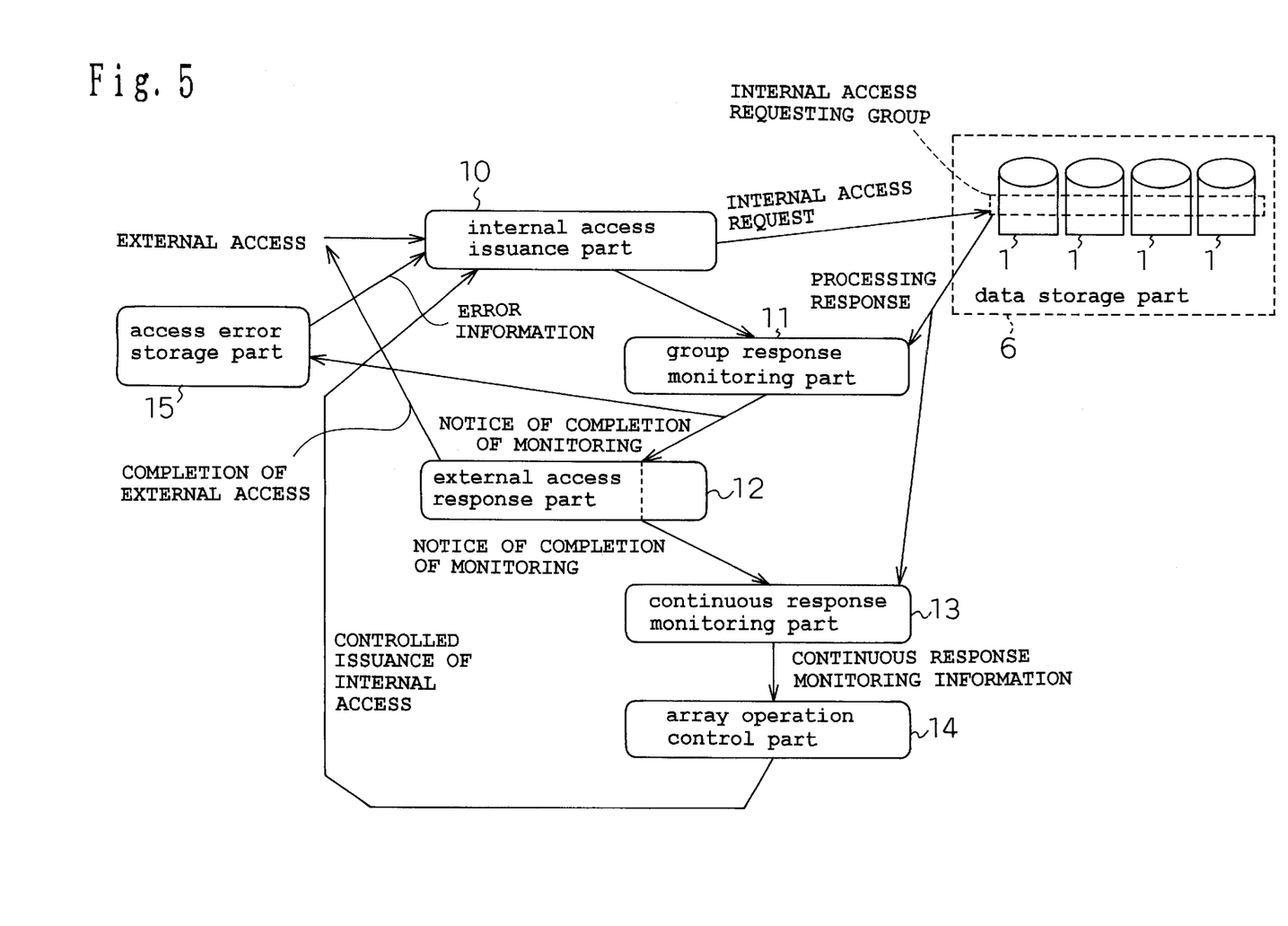
FIG. 5 is a configuration diagram of the data storage array apparatus according to the second preferred embodiment.

FIG. 5 is a configuration diagram of the data storage array apparatus according to the second preferred embodiment of the present invention, which is characterized in being different from the first preferred embodiment in that an access error storage part 15 is used.

Hence, operations conducted by the internal access issuance part 10 are different. In other words, the internal access issuance part 10 issues internal access requests to the data storage parts 6 not only based on control provided by the array operation control part 14 regarding internal accesses but also based on a content in the access error storage part 15 which stores an error status of a previously issued internal access.

In response to the notice of completion of monitoring from the group response monitoring part 11, the access error storage part 15 registers an external access for which no processing response was received from the data storage parts 6, for which an error response was received or for which an internal access request is subjected to suppression of issuance within the internal access issuance part 10.

In addition to a case where there was no processing response, a case that an error response was received or an internal access request was not issued is also registered. Following this, data are reconstructed using parity but without reading from the corresponding HDD. In this manner, it is possible to avoid a wasteful operation.

Further, monitoring a period of time elapsed since the continuous response monitoring part 13 has requested for continuous response monitoring and noting that a normal response has been received during a certain period of time and the requested processing is writing, the array operation control part 14 deletes corresponding error information from the access error storage part 15.

This allows to return to the normal operation upon receipt of a read request from the corresponding HDD, and therefore, a probability of degeneration decreases and the reliability further improves.

As described above, according to the present invention, since internal accesses are controlled by means of the number of absences of completion responses (the number of time-out) a probability of degeneration decreases and the data storage array apparatus has a high reliability. A hard disk device is applied to various types of apparatuses in addition to computers these days and a demand for a better reliability is very strong, and therefore, the present invention is extremely useful.

Processing at the historical information holding step according to the present invention corresponds to the contents of the operations conducted by the access error storage part.

The present invention is also directed to a program which works with a computer such that the computer executes all or some functions (elements, circuits, means, etc.) of the data storage array apparatus described above according to the present invention.

The present invention is further directed to a program which works with a computer such that the computer executes all or some steps (or functions, etc.) of the method of controlling access to the data storage array apparatus described above according to the present invention.

The present invention is still further directed to a medium which can be read on a computer and holds a program and/or data for making the computer execute all or some operations at all or some steps described above according to the present invention such that the program and/or data read out works with the computer to carry out the operations.

In addition, the present invention is directed to a medium which can be read on a computer and holds a program and/or data for making the computer execute all or some functions of all or some means described above according to the present invention such that the program and/or data read out works with the computer to carry out the functions.

The preferred embodiment described above relates to whether processing in each one of the hard disk devices corresponding to internal access requests has completed within a predetermined period of time or not is checked, whether the number of incomplete accesses is equal to or smaller than a predetermined number is used as a criteria for judgment, and as far as this criteria for judgment is satisfied (that is, as far as the number above is equal to or smaller than the predetermined number) internal access requests (commands) to all hard disk devices are issued and degeneration is not invoked. However, this is not limiting. Instead, for instance, pseudo degeneration may be invoked under a certain condition, and as far as the criteria for judgment above is satisfied, during a cycle period of the pseudo degeneration, internal access requests (commands) may be issued to all hard disk devices including a hard disk device which is a cause of the pseudo degeneration.

The "pseudo degeneration" referred to here is not a condition that a certain hard disk device, due to a breakdown or the like, can not be read for ever, but is an operation, for a situation that reading is ongoing but incomplete within a predetermined period of time, of using data read out from other hard disk device in which reading has already completed within this period and restoring data which are to be read out from the hard disk device in which reading has not completed yet. This is distinguished from the conventional "operation of degeneration" which is executed in a situation that reading from a hard disk device is impossible due to a breakdown or the like.

An example where a result of reading in the cycle C1 is obtained at t=2 will be more specifically described with reference to FIG. 4. That is, this is a configuration in which for obtaining a result of reading in the cycle C1, whether reading from the respective hard disk devices HDD-A through HDD-C have completed at t=1' or not is checked and whether to invoke pseudo degeneration is decided. Since reading is not complete in the hard disk device HDD-C at t=1, pseudo degeneration is invoked and data to be read out from HDD-C are restored using data which are read out from HDD-A and HDD-B. Thus, data read out from HDD-C are not used. In this case as well, however, a major difference from the conventional configuration is that as far as the criteria for judgment above is satisfied, in the cycle C2, commands including an access request to be newly issued to HDD-C are issued to all hard disk devices.

In other words, according to the present invention, a configuration may be that degeneration is not invoked as far as the criteria for judgment above is satisfied or that even when pseudo degeneration is invoked, issuance of a new internal access request to a hard disk device which corresponds to an internal access request which invoked the pseudo degeneration is not stopped uniformly, but internal access requests are issued to all hard disk devices as far as the criteria for judgment above is satisfied.

In short, the largest characteristic of the present invention is that issuance of internal access requests to data storage parts is stopped less frequently.

As clearly described above, the present invention provides a data storage array apparatus which bears a reduced probability of invoking degeneration and has a high reliability. Further, according to the present invention, it is possible to reduce issuance of internal access requests to data storage parts as compared with the conventional techniques.

What is claimed is:

1. A data storage array apparatus which comprises a plurality of data storage parts which store transferred data in accordance with a predetermined rule, an access issuance part, a group response monitoring part, an access response part, a continuous response monitoring part and an array operation control part, comprising:

said access issuance part, by means of a predetermined algorithm, groups first access requests from a sender of said data into a group which includes second access requests directed to said more than one data storage parts, treats said group as a second access requesting group, and issues said second access requests included in said second access requesting group to said data storage parts based on access issuance control provided to said data storage parts by said array operation control part, said group response monitoring part individually manages each said second access requesting group, monitors processing responses, in said data storage parts, of said second access requesting group until said second access requesting group satisfies a predetermined condition, and issues a notice of completion of monitoring when said condition is satisfied, said access response part notifies said sender of said data of completion of accessing in response to a predetermined situation, said continuous response monitoring part classifies, for each data storage part, said second access requests of said second access requesting group which were met with no processing response from the data storage parts and further continuously monitors whether there are corresponding processing responses based on said notice of completion of monitoring thus issued, and issues a result of the monitoring as continuous response monitoring information, said array operation control part provides access issuance control for said data storage parts to said access issuance part based on said continuous response monitoring information thus issued, so that an operation mode of said data storage array apparatus as a whole is controlled.

2. The data storage array apparatus according to claim 1, wherein said access response part notifies said sender of said data of completion of accessing based on said notice of completion of monitoring from said group response monitoring part.

3. The data storage array apparatus according to claim 1, wherein said access response part notifies said sender of said data of completion of accessing based on a notice of issuance from said access issuance part.

4. The data storage array apparatus according to claim 1, wherein during reading, based on said notice of completion of monitoring from said group response monitoring part, said access response part restores, using redundancy, data (1) for which there was no processing response, in said data storage parts, of said second access requesting group, or (2) for which there was an error response, or (3) for which issuance of second access requests were suppressed in said access issuance part, and said access response part notifies said sender of said data of completion of accessing.

5. A data storage array apparatus which comprises a plurality of data storage parts which store transferred data in accordance with a predetermined rule, an access issuance part, a group response monitoring part, an access error storage part, an access response part, a continuous response monitoring part and an array operation control part, comprising:

said access issuance part, by means of a predetermined algorithm, groups first access requests from a sender of said data into a group which includes second access requests to said more than one data storage parts, treats said group as a second access requesting group, and issues said second access requests included in said second access requesting group to said data storage parts based on access issuance control provided to said data storage parts by said array operation control part and based on a content in said access error storage part which stores an error status of a previously issued external access, said group response monitoring part individually manages each said second access requesting group, monitors processing responses in said data storage parts directed to said second access requesting group until said second access requesting group satisfies a predetermined condition, and issues a notice of completion of monitoring when said condition is satisfied, said access error storage part registers, based on said notice of completion of monitoring thus issued, accesses (1) for which there was no processing response, in said data storage parts, of said second access requesting group or for which there was an error response, or (2) for which issuance of second access requests were suppressed in said access issuance part, said access response part notifies said sender of said data of completion of accessing in response to a predetermined situation, said continuous response monitoring part classifies, for each data storage part, said second access requests of said second access requesting group which were met with no processing response from the data storage parts and further continuously monitors whether there are corresponding processing responses based on said notice of completion of monitoring thus issued, and issues a result of the monitoring as continuous response monitoring information, said array operation control part provides access issuance control for said data storage parts to said access issuance part based on said continuous response monitoring information thus issued, so that an operation mode of said data storage array apparatus as a whole is controlled.

6. The data storage array apparatus according to claim 5, wherein said access response part notifies said sender of said data of completion of accessing based on said notice of completion of monitoring from said group response monitoring part.

7. The data storage array apparatus according to claim 5, wherein said access response part notifies said sender of said data of completion of accessing based on a notice of issuance from said access issuance part.

8. The data storage array apparatus according to any one of claims 1 through 7, wherein there are as many said continuous response monitoring parts as said data storage parts.

9. The data storage array apparatus according to any one of claims 1 through 7, wherein said array operation control part investigates, based on said continuous response monitoring information from said continuous response monitoring part, the number of said second access requests to which processing has not completed, and when this number reaches or exceeds a certain number, said array operation control part prohibits issuance of said second access requests to corresponding ones of said data storage parts.

10. The data storage array apparatus according to any one of claims 1 through 7, wherein said array operation control part stores the number of times said continuous response monitoring part has executed continuous response monitoring, and when this number reaches or exceeds a certain number, said array operation control part shifts said data storage array apparatus into an operation of degeneration.

11. The data storage array apparatus according to claim 9, wherein said array operation control part, after prohibiting issuance of said second access requests, shifts the entire operation of said data storage array apparatus into an operation of temporary degeneration, and said temporary degeneration is an operation that issuance of said second access requests directed to one or more of said data storage parts which form said data storage array apparatus is temporarily suppressed, and with respect to an access occurring during this, access data are restored utilizing a redundant configuration.

12. The data storage array apparatus according to any one of claims 1 through 7, wherein said array operation control part investigates, based on said continuous response monitoring information from said continuous response monitoring part, the number of said second access requests to which processing has not completed, and when this number is equal to or smaller than a certain number, said array operation control part lifts the prohibition of issuance of said second access requests to corresponding ones of said data storage parts.

13. The data storage array apparatus according to claim 12, wherein said array operation control part, after resolving the prohibition of issuance of said second access requests, shifts the entire operation of said data storage array apparatus from temporary degeneration into normal or partial reconstruction, and an operation of said partial reconstruction is an operation of adding redundancy of data to writing which occurs during said temporary degeneration.

14. The data storage array apparatus according to any one of claims 1 through 7, wherein when recognizing based on said continuous response monitoring information that said second access requests under monitoring are not completed yet even after a predetermined period of time, said array operation control part prohibits issuance of said second access requests to corresponding ones of said data storage parts and issues a reset command or a cancel command to corresponding ones of said data storage parts.

15. The data storage array apparatus according to claim 14, wherein when said array operation control part issues said reset command, said array operation control part lifts the prohibition of issuance of said second access requests to corresponding ones of said data storage parts upon normal completion of said reset command and shifts the entire operation of said data storage array apparatus from temporary degeneration into normal or partial reconstruction.

16. The data storage array apparatus according to claim 14, wherein after said array operation control part issues said reset command, if said reset command ends abnormally, said array operation control part issues said reset command once again to corresponding ones of said data storage parts.

17. The data storage array apparatus according to claim 14, wherein the number of times that said array operation control part has issued said reset command is stored, and when this number becomes a certain number or larger, said data storage array apparatus is shifted into an operation of degeneration from an operation of temporary degeneration.

18. The data storage array apparatus according to claim 14, wherein said array operation control part recognizes based on said continuous response monitoring information a response which indicates that said second access requests under monitoring have completed during said predetermined period of time, and if these requests are writing, said array operation control part deletes corresponding requests from said access error storage part.

19. The data storage array apparatus according to claim 1 or 5, wherein said predetermined condition is satisfied (1) when N−1 pieces of said second access requests are met with responses which indicate completion of processing in the case that there are N pieces of said second access requests included in said second access requesting group, or (2) when a predetermined period of time has elapsed after issuance of said second access requests which are included in said second access requesting group.

20. A method of controlling access to a data storage array apparatus which comprises a plurality of data storage parts which divide predetermined data and store as data having a redundant configuration, comprising:

an access issuing step of creating and issuing a plurality of second access requests which respectively correspond to said data storage parts based on a predetermined algorithm in response to a first access request;

a monitoring step of monitoring whether processing corresponding to said second access requests thus issued have completed during a predetermined period of time and issuing a result of monitoring; and a decision step of deciding, based on information included in said result of monitoring thus issued regarding the number of said accesses which have not completed yet, whether to newly issue second access requests at said access issuing step.

21. The method of controlling access to a data storage array apparatus according to claim 20, comprising a historical information holding step of holding historical information, which indicates whether said accesses have been processed normally in said data storage parts, for each one of said data storage parts, wherein at said decision step, said decision is made considering said historical information as well which is held at said historical information holding step.

22. A program for making a computer function as all or part of said parts except for said data storage parts of the data storage array apparatus according to claim 1 or 5.

23. A program for making a computer execute all or part of said steps of the method of controlling access to a data storage array apparatus according to claim 20.

24. A medium which can be read on a computer and holds a program and/or data for making a computer execute the functions of all or part of said parts except for said data storage parts of the data storage array apparatus according to claim 1 or 5.

25. A medium which can be read on a computer and holds a program and/or data for making a computer execute the operations at all or part of said steps of the method of controlling access to a data storage array apparatus according to claim 20.

* * * * *